United States Patent
Hwang et al.

(10) Patent No.: US 9,929,873 B2
(45) Date of Patent: Mar. 27, 2018

(54) VOICE CONTROL USING MULTI-MEDIA ROOMS

(71) Applicant: Vivint, Inc., Provo, UT (US)

(72) Inventors: Jungtaik Hwang, Draper, UT (US); Matthew J. Eyring, Provo, UT (US); Jeremy Bruce Warren, Draper, UT (US); James Ellis Nye, Alpine, UT (US)

(73) Assignee: Vivint, Inc., Provo, UT (US)

(*) Notice: Subject to any disclaimer, the term of this patent is extended or adjusted under 35 U.S.C. 154(b) by 223 days.

(21) Appl. No.: 14/561,655

(22) Filed: Dec. 5, 2014

(65) Prior Publication Data

US 2015/0162007 A1 Jun. 11, 2015

Related U.S. Application Data

(60) Provisional application No. 61/912,973, filed on Dec. 6, 2013.

(51) Int. Cl.

| G10L 21/00 | (2013.01) |
|---|---|
| H04L 12/28 | (2006.01) |
| G10L 17/00 | (2013.01) |
| G06F 3/16 | (2006.01) |
| G06F 21/32 | (2013.01) |
| G10L 15/26 | (2006.01) |
| G10L 15/22 | (2006.01) |

(52) U.S. Cl.
CPC .......... H04L 12/282 (2013.01); G06F 3/167 (2013.01); G10L 17/005 (2013.01); *G06F 21/32* (2013.01); *G10L 15/22* (2013.01); *G10L 15/265* (2013.01)

(58) Field of Classification Search
CPC ....... G10L 15/22; G10L 15/30; G10L 15/265; G10L 15/063
See application file for complete search history.

(56) References Cited

U.S. PATENT DOCUMENTS

| 5,625,697 | A | * | 4/1997 | Bowen | H04M 9/08 367/126 |
|---|---|---|---|---|---|
| 8,340,975 | B1 | * | 12/2012 | Rosenberger | G10L 15/22 704/270 |
| 2009/0006975 | A1 | * | 1/2009 | Salim | G06F 17/3089 715/738 |
| 2014/0229184 | A1 | * | 8/2014 | Shires | H04L 12/12 704/275 |
| 2014/0334645 | A1 | * | 11/2014 | Yun | G10L 15/08 381/110 |

* cited by examiner

*Primary Examiner* — Vu B Hang
(74) *Attorney, Agent, or Firm* — Holland & Hart LLP

(57) ABSTRACT

Methods and systems are described for controlling an automation and security system. According to at least one embodiment, an apparatus for voice control of an automation and security system includes a processor, a memory in electronic communication with the processor, and instructions stored in the memory. The instructions are executable by a processor to detect a trigger word spoken by a user at a location remote from a control panel of the automation and security system, detect a command spoken by the user at the remote location which follows the trigger word, deliver at least one audio response to the user at the remote location in response to the command, and perform an action in response to the command.

19 Claims, 9 Drawing Sheets

VOICE CONTROL USING MULTI-MEDIA ROOMS

CROSS REFERENCE

This application claims priority from U.S. Provisional Patent Application No. 61/912,973 entitled "VOICE CONTROL USING MULTI-MEDIA ROOMS," which was filed 6 Dec. 2013.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, such as multi-media systems and devices, challenges exist in communicating with, integrating, and controlling the various components.

SUMMARY

Methods and systems are described for voice control of an automation and/or security system. According to at least one embodiment, an apparatus for voice control of an automation and security system includes a processor, a memory in electronic communication with the processor, and instructions stored in the memory which are executable by a processor to detect a trigger word spoken by a user at a location remote from a control panel of the automation and security system, detect a command spoken by the user at the remote location which follows the trigger word, deliver at least one audio response to the user at the remote location in response to the command, and perform an action in response to the command.

In one embodiment, the apparatus includes at least one multi-media device at the remote location, wherein detecting the trigger word and detecting the command are performed by the at least one multi-media device. The instructions also include delivering the command from the at least one multi-media device to the control panel. The at least one multi-media device may include a speaker configured to deliver the at least one audio response to the user and a microphone configured to detect the trigger word and the command. The at least one audio response may include a request for confirmation of the command, and the instructions may further include detecting a confirmation of the command spoken by the user at the remote location. The at least one audio response may include a confirmation that the action is completed.

In another example, the instructions include detecting with the control panel a trigger word spoken by a user, detecting with the control panel a command spoken by the user which follows the trigger word detected with the control panel, delivering with the control panel at least one audio response to the user in response to the command, and performing an action in response to the command. The control panel may include a speaker configured to deliver the at least one audio response from the control panel and a microphone configured to detect the trigger word and command with the control panel. The apparatus may include a plurality of multi-media devices at the remote location, and detecting the trigger word and detecting the command are performed by at least two of the plurality of multi-media devices.

In another embodiment, a computer-program product for voice control of an automation and security system having at least one multi-media device and a control panel includes a non-transitory computer-readable medium storing instructions executable by a processor to detect a command spoken by a user with the at least one multi-media device at a location remote from the control panel, deliver at least one audio response to the user via the at least one multi-media device at the remote location in response to the command, and perform at least one automation or security action in response to the command.

In one embodiment, the command may include a request for confirmation of a status of the automation and security system. The command may include turning ON or turning OFF a security feature of the automation and security system. The instructions may include detecting a trigger word spoken by the user with the at least one multi-media device before detecting the command. Delivering at least one audio response may include asking a question of the user to confirm the command. Each of the at least one multi-media devices may include a microphone configured to detect the command and a speaker configured to deliver the at least one audio response.

In a further embodiment, a computer-implemented method for voice control of an automation and security system comprises monitoring one or more multi-media devices for an audible trigger word spoken by a user, detecting the trigger word with the one or more multi-media devices, detecting a command spoken by a user with the one or more multi-media devices following detecting the trigger word, confirming the command, and performing with the control panel at least one action in response to the command.

In one embodiment, confirming the command includes delivering at least one audio message to the user via the at least one multi-media device in response to the command and detecting a confirming response from the user. The one or more multi-media devices may filter at least one of the detected trigger word and the detected command before delivering the at least one of the detected trigger word and the detected command to the control panel. Confirming the command may include comparing the command to a database of commands. Confirming the command may be performed by the one or more multi-media devices.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
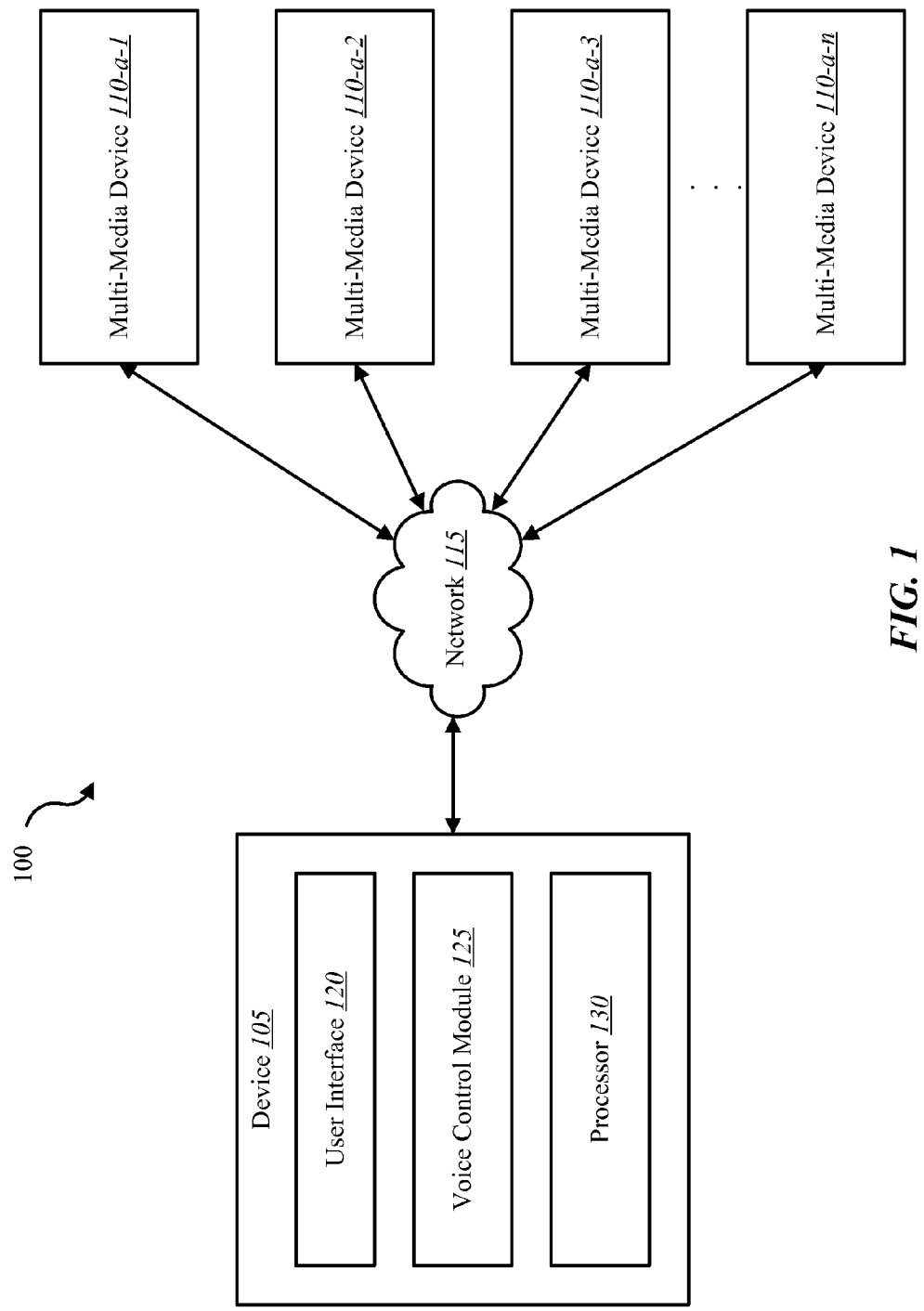
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to voice control of such systems and methods. The voice control aspects of the automation and security systems and methods described herein may utilize multi-media devices which are positioned throughout the property at locations remote from a control panel of the automation and security system. The multi-media devices may include at least a speaker and a microphone. The system monitors the property via the speakers of the multi-media devices to identify a trigger sound (e.g., word, phrase or other audible sound) made by an inhabitant of the property (e.g., a user). After the trigger sound is identified, the system may automatically perform any one of numerous actions associated with the automation and security system. For example, the system may communicate with the user at the location in which the trigger sound is made via the speaker. The user may make other sounds such as speaking a command that is also collected via the microphone and that results in the system automatically performing other actions.

The voice control features disclosed herein may provide single step or multi-step sequences for controlling aspects of an automation and security system. Each step of the sequence may involve communications back-and-forth between a user residing in the property. The user may speak trigger words, commands, and/or questions (or make other audible noises) and the system may respond with an action, provide a response to the user to confirm the trigger word or command, and/or respond to confirm when the action is complete.

The microphones and speakers used to communicate between the user and the system may be integrated into unitary multi-media devices that are positioned at various locations on the property. The control panel of the system may also include at least one of a speaker and a microphone to provide yet another location for voice control communications between the user and the system. The communications from the user to the system may be collected and/or transmitted via a single multi-media device or may be collected and/or transmitted via a plurality of multi-media devices depending on a number of factors. Some example factors include the proximity of the multi-media devices to each other and the movement of the user within the property within a given time period. The system may communicate with the user via a single or multiple multi-media devices for similar reasons.

The speakers and microphones may be separated from each other and positioned within the property at different locations. The speakers and microphones may be combined with other equipment such as motion detectors, video cameras, heat detectors, smoke detectors and lighting. The speakers, microphones, and multi-media devices generally may be positioned at any desired location in a room or other space. For example, floors, walls, ceilings, support members, electronic equipment, and furniture may be used to support one or more speakers, microphones, or other multi-media devices used with the voice control aspects of the automation and security systems and methods disclosed herein.

The multi-media devices may include other functionality beside simply collecting and delivering audible communications. For example, the multi-media device may include a processor and the capability to perform some logic associated with the audible communications. In one embodiment, the processor of a multi-media device may determine whether certain spoken words meet the requirements of a trigger word and/or command and then send signals to the control panel of the system in response to what the processor determines related to the spoken words.

FIG. 1 is a block diagram illustrating one embodiment of an environment 100 in which the present systems and methods may be implemented. In some embodiments, the systems and methods described herein may be performed on a remote management device 105 (e.g., a control panel). The environment 100 may include the device 105 and a plurality of multi-media devices 110-*a* that communicate over at least one network 115. The network 115 provides communication via, for example, wired or wireless connections. Further, the network 115 may include a plurality of communication mediums.

In some embodiments, the remote management device 105 is a portable electronic device with a touch screen display. The device 105 may be in communication with one or more sensors. A sensor may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

In some configurations, device 105 may include components such as a user interface 120, a voice control module 125, and a processor 130. Although the components of device 105 are depicted as being internal to device 105, it is understood that one or more of the components may be external to the device 105 and connect to device 105 through wired and/or wireless connections. For example, one or more components (e.g., software, firmware, and/or hardware) of voice control module 125 may be located, installed, and/or part of other components and/or systems of environment 100.

In some embodiments, device 105 may communicate with each of the multi-media devices 110-*a* separately via the network 115. Alternatively, device 105 may communicate with the multi-media devices 110-*a* through a relay connection in which information is transmitted through a plurality of multi-media devices 110-*a* and the network 115 in order to reach device 105. Examples of network 115 includes cloud networks, local area networks (LAN), wide area networks (WAN), virtual private networks (VPN), wireless networks (using 802.11, for example), and/or cellular networks (using 3G and/or LTE, for example), etc. In some embodiments, the network 115 may include the Internet.

The voice control module 125 may operate to provide the communications back and forth with the multi-media devices 110-*a*. The voice control module 125 may monitor for trigger words collected at the multi-media device 110-*a*, monitor for commands collected at multi-media devices 110-*a*, and provide responses back to a user via the multi-media devices 110-*a*. Voice control module 125 may also provide commands or signals to processor 130 to perform various actions. For example, a command given by a user may be to turn up the thermostat temperature for one or more rooms in the property. Voice control module 125, in response to the command, may prompt processor 130 to adjust the thermostat accordingly. In another example, a command issued by the user may be to arm a security system of environment 100. Voice control module 125, in response to the command, may prompt processor 130 to arm the security system. In other examples, processor 130 may be used in conjunction with operation and voice control module 125 to identify whether sounds collected by multi-media devices 110-*a* meet the requirements of a trigger word, command, inquiry, or other response from a user. Processor 130 may operate in conjunction with memory, databases, etc., which may also be part of device 105.

Figure 2:
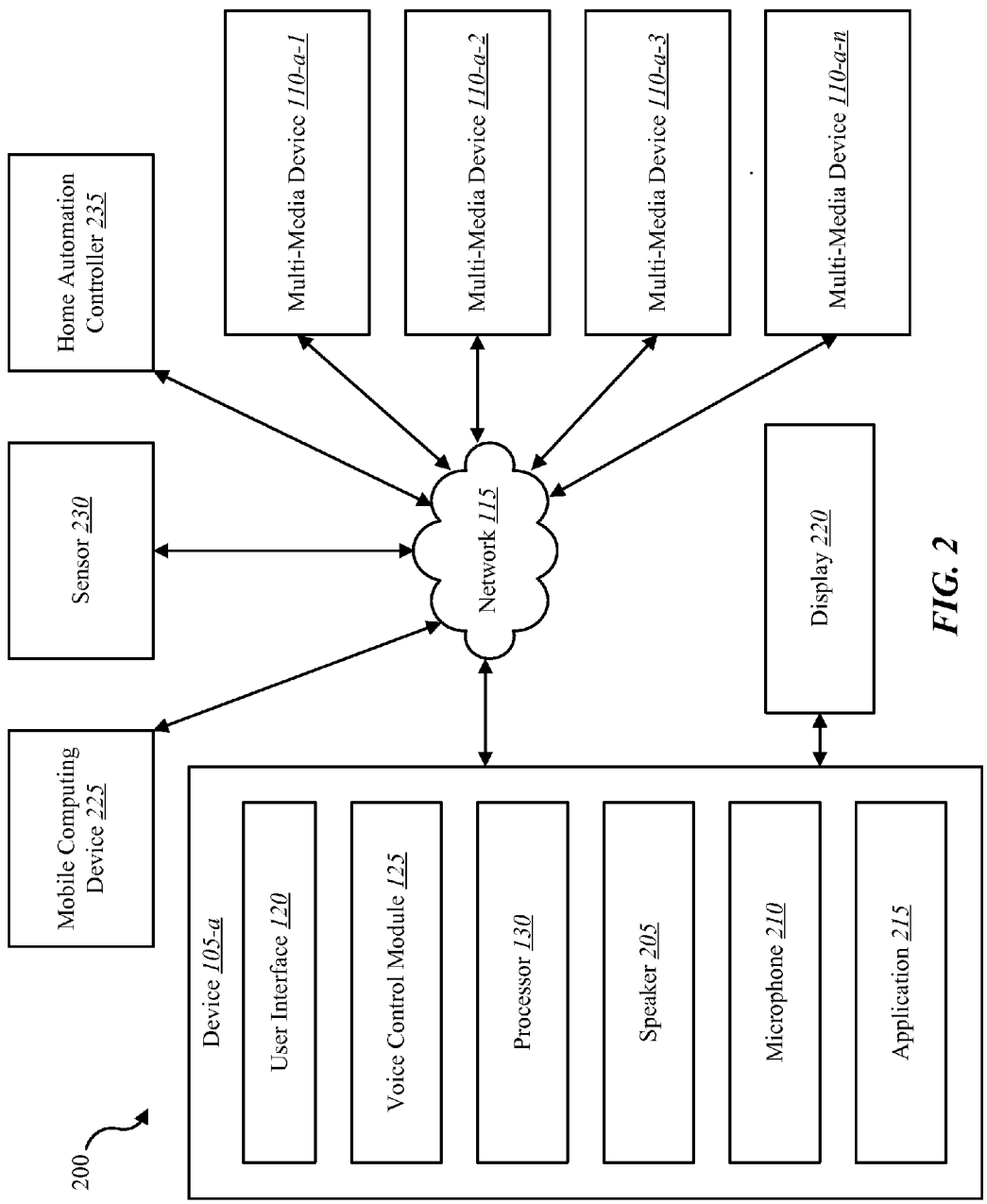
FIG. 2 is a block diagram of another environment in which the present systems and methods may be implemented.

Referring now to FIG. 2, in some embodiments, an environment 200 may include the components of environment 100 described above, and may further include a device 105-*a* which may be an example of device 105 illustrated in FIG. 1. The device 105-*a* may further include a speaker 205, a microphone 210, and an application 215. Environment 200 may also include a display 220, a mobile computing device 225, a sensor 230, and a home automation controller 235.

Device 105-*a* may include some of the functionality of multi-media devices 110-*a* related to voice control. For example, speaker 205 and microphone 210 may be used to provide communication between the user and device 105-*a*. Microphone 210 may be used to monitor for trigger words, commands, and inquiries from a user in proximity to device 105-*a*. Speaker 205 may be used to communicate responses to the user. Speaker 205 and microphone 210 may provide for hands-free operation of at least some aspects of device 105-*a*.

Application 215 may allow a user to control (either directly or via home automation controller 235) an aspect of the monitored property, including security, energy management, locking or unlocking a door, checking the status of a door, locating a user or item, controlling lighting, thermostat, cameras, receiving notification regarding a current status or anomaly associated with a home, office, place of business, and the like. In some configurations, application 215 may enable device 105-*a* to interface with home automation controller 235 and provide the user interface 120 to display automation, security, and/or energy management content on device 105-*a* and/or mobile computing device 225. Thus, application 215, via the user interface 120, may allow users to control aspects of their home, office, and/or other type of property. Further, application 215 may be installed on mobile computing device 225 in order to allow a user to interface with a function of device 105-*a*, home automation controller 235 multi-media devices 110-*a*.

In some embodiments, mobile computing device 225 may include a television set. Additionally, or alternatively, mobile computing device 225 may include one or more processors, one or more memory devices, and/or a storage device. Examples of mobile computing device 225 may include a viewing device associated with a media content set top box, satellite set top box, cable set top box, DVRs, personal video recorders (PVRs), and/or mobile computing devices, smart phones, personal computing devices, computers, servers, etc.

Sensor 230 shown in FIG. 2 may represent one or more separate sensors or a combination of two or more sensors in a single sensor device. For example, sensor 230 may represent one or more camera sensors and one or more motion sensors connected to environment 200. Additionally, or alternatively, sensor 230 may represent a combination sensor such as both a camera sensor and a motion sensor integrated in the same sensor device. Although sensor 230 is depicted as connecting to device 105-*a* over network 115, in some embodiments, sensor 230 may connect directly to device 105-*a*. Additionally, or alternatively, sensor 230 may be integrated with a home appliance or fixture such as a light bulb fixture. Sensor 230 may include an accelerometer to enable sensor 230 to detect a movement. Sensor 230 may include a wireless communication device enabling sensor 230 to send and receive data and/or information to and from one or more devices in environment 200. Additionally, or alternatively, sensor 230 may include a GPS sensor to enable sensor 230 to track a location of sensor 230. Sensor 230 may include a proximity sensor to enable sensor to detect proximity of a user relative to a predetermined distance from a dwelling (e.g., geo-fencing). Sensor 230 may include one or more security detection sensors such as, for example, a glass break sensor, a motion detection sensor, or both. Additionally, or alternatively, sensor 230 may include a smoke detection sensor, a carbon monoxide sensor, or both.

In some embodiments, a user may access the functions of device 105-*a* and/or home automation controller 235 from mobile computing device 225. For example, in some embodiments, mobile computing device 225 includes a mobile application that interfaces with one or more functions of device 105-*a*, home automation controller 235, and/or multi-media devices 110-*a*. Examples of the home automation controller 235 may include a dedicated home automation computing device (e.g., wall-mounted controller), a personal computing device (e.g., laptop, desktop, etc.), a mobile computing device (e.g., tablet computing device, smartphone, etc.), and the like.

In some embodiments, device 105-*a* may be integrated with home automation controller 235 in the form of one or more personal computing devices (e.g. mobile devices, smart phones, and/or personal computing devices) to both control aspects of a property as well as to receive and display notifications regarding monitored activity of a property.

Figure 3:
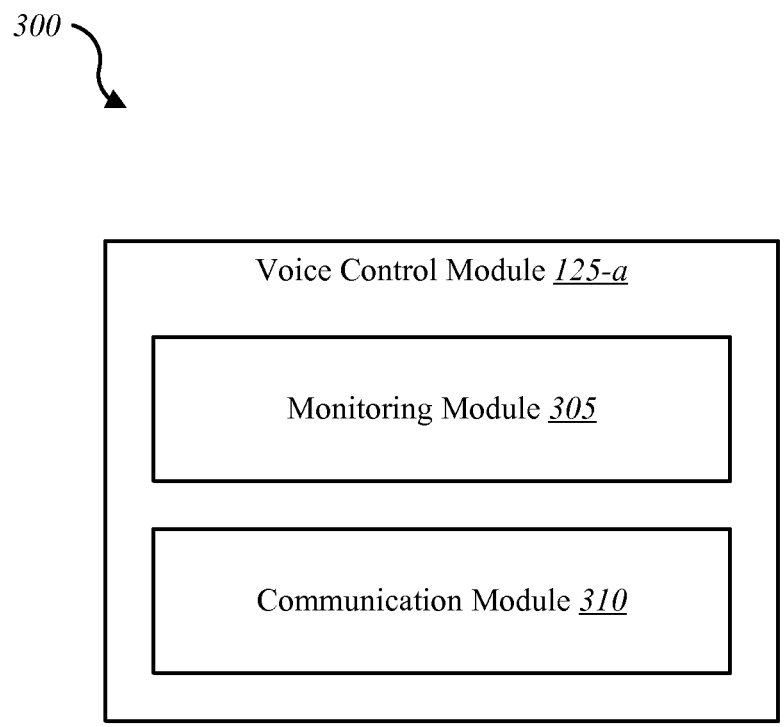
FIG. 3 is a block diagram of an example voice control module of the environments shown in FIGS. 1 and 2.

FIG. 3 is a block diagram 300 illustrating one example of a voice control module 125-*a*. Voice control module 125-*a* may be one example of voice control module 125 depicted in FIGS. 1 and/or 2. As depicted, voice control module 125-*a* may include a monitoring module 305 and a communication module 310. Voice control module 125-*a* may include additional or fewer modules and capability in other embodiments. Similarly, monitoring module 305 and communication module 310 may include additional modules and functionality than that which is described with reference to FIG. 4.

Monitoring module 305 may operate to provide monitoring of audible sounds within the property serviced by, for example, environments 100 and/or 200 illustrated in FIGS. 1 and 2. Monitoring module 305 may be in electronic communication with the multi-media devices 110-*a* as well as the microphone 210 of device 105-*a*. Each of the multi-media devices 110-*a* may include a microphone as described below with reference to FIG. 5. Monitoring module 305 may operate in a constant ON state. In other embodiments, monitoring module 305 may operate at only certain times of the day or days of the week. In the ON state, monitoring module 305 may "listen" for trigger words, commands and/or inquires from one or more users or persons within the property via a plurality of microphones. Monitoring module 305 may filter or pass sounds that do not meet the requirements of one of a trigger word or sound, command and/or inquiry. For example, monitoring module 305 may remain in a trigger word listen state until a trigger word is identified. Once the trigger word is identified, monitoring module 305 may move into another mode or state in which it "listens" for a command or inquiry. If a trigger word or sound is not first identified, monitoring module 305 may ignore any commands or inquiries being spoken by a user.

In some examples, a trigger word is the same as or part of a command or inquiry. As such, the user speaking a command may also trigger the voice control module 125-*a* into an active state (e.g., an action is performed such as responding to the user via communication module 310 or performing another action via device 105. In one example, the user may speak the phrase "is system armed?" The phrase "is system" or the phrase "is system armed" may include the trigger words. The word "armed" or the phrase "is system armed" may be a command or an inquiry which requires feedback concerning the state of the security system. Monitoring module 305 may identify the trigger and/or command, and the communication module 310 may be used to respond back to the user with a question such as "did you ask if the system is armed," or a response such as "the system is armed" to confirm the status of the system.

Communication module 310 may operate to proactively communicate with the user in addition to providing responsive communications to the user's trigger words, commands or inquiries. For example, communication module 310 may deliver a message to the user via one or all of the multi-media devices 110-*a* inquiring "is a user present on the property," "would you like to lower the temperature" if the temperature on the property rises above a standard level, or "would you like to arm the system" after a certain time of the day. The user's response may be collected with multi-media devices 110-*a* and/or monitoring module 305. Further communications may be made to the user via communication module 310 and/or multi-media devices 110-*a*. The device 105 may carry out an action associated with the communications.

Communication module 310 may provide communications to the user via other sounds besides spoken words. For example, communication module 310 may send signals in the form of notes, a sequence of sounds (beeps or chimes) or other common sounds such as animal, vehicle, hunting, or sports sounds. Further, the audible responses from communication module 310 may draw from a database of different languages.

The voice control module 125-*a* may have a smart or learning capability in which the nuances of the voices of those users who are commonly on the property may be taken into account to provide more accurate communications with the user.

Figure 4:
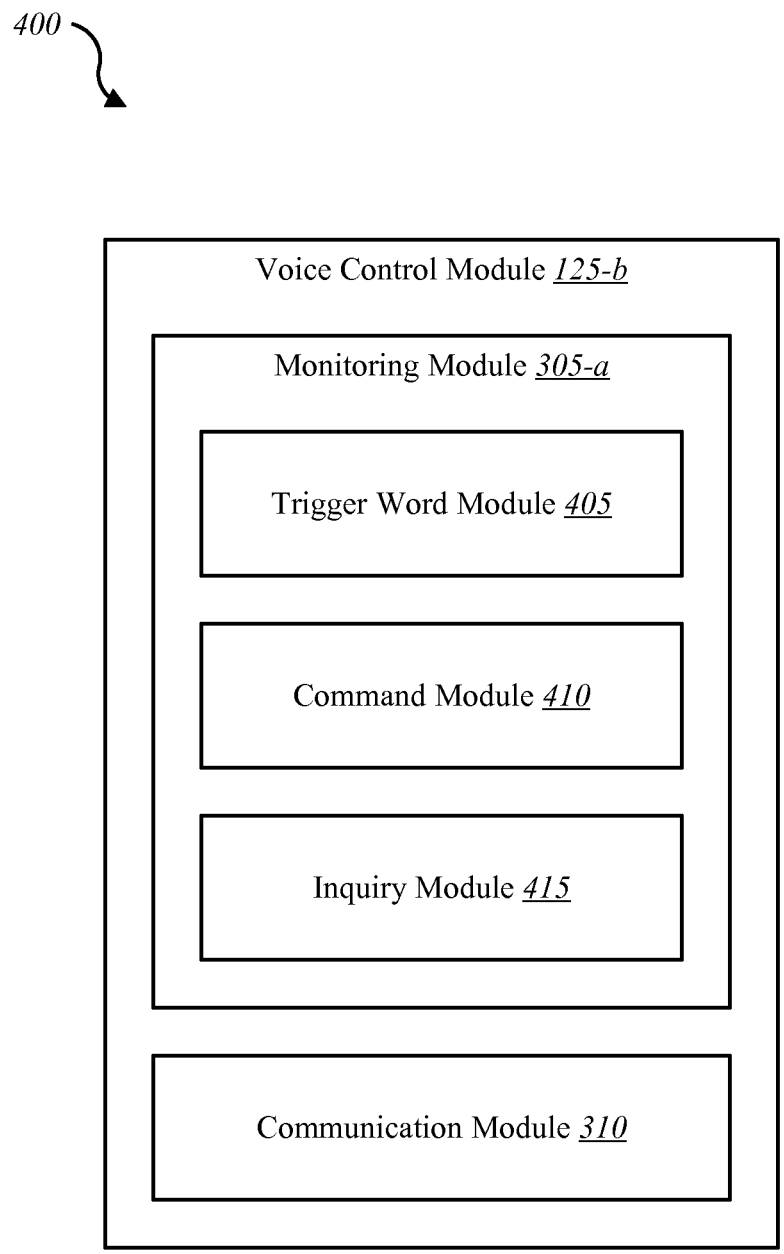
FIG. 4 is a block diagram of another example voice control module of the environments shown in FIGS. 1 and 2.

FIG. 4 is a block diagram 400 illustrating another example of a voice control module 125-*b*. Voice control module 125-*b* may be one example of voice control module 125 depicted in FIGS. 1, 2, and/or 3. As depicted, voice control module 125-*b* may include monitoring module 305-*a* and communication module 310. Monitoring module 305-*a* may be one example of monitoring module 305 depicted in FIG. 3. Monitoring module 305-*a* may include a trigger word module 405, a command module 410, and an inquiry module 415.

Trigger word module 405 and command module 410 may operate within monitoring module 305-*a*. Trigger word module 405 may "listen" for trigger words or sounds that activate the voice control. Command module 410 may "listen" for command words, phrases and sounds from a user. Inquiry module 415 may "listen" for inquiries in the form of, for example, questions posed by the user. In some embodiments, at least some of the trigger word, command and inquiry functionality of modules 405, 410, 415 may be combined into less than three modules. In other embodiments, additional modules may be added to monitoring module 305-*a* to provide other functionality. Modules 405, 410, 415 may be electronically connected to databases of trigger words, commands and inquiries that meet the qualifications of the trigger words, command and inquiries identifiable by voice control module 125-*b*.

Figure 5:
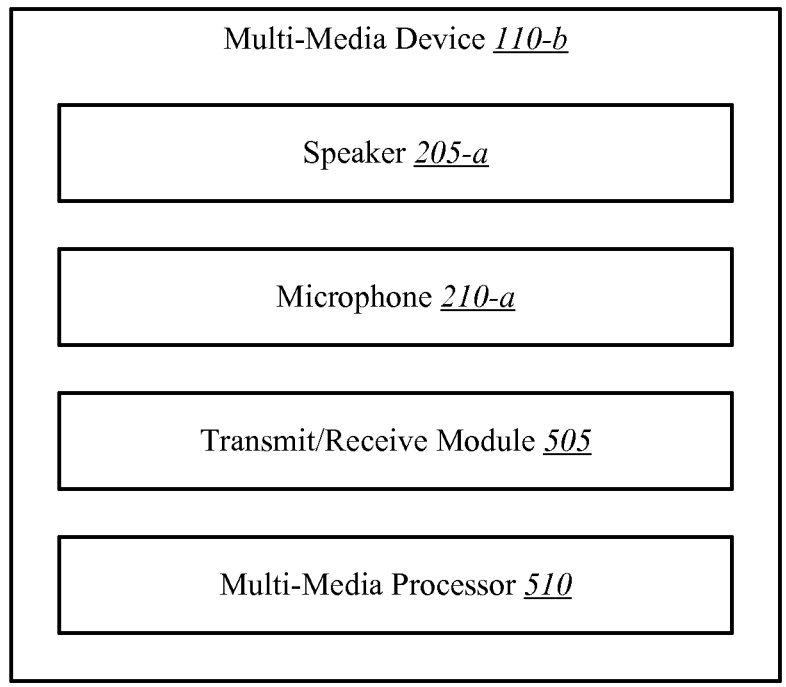
FIG. 5 is a block diagram of an example multi-media device of the environments shown in FIGS. 1 and 2.

FIG. 5 is a block diagram 500 illustrating an example multi-media device 110-*b*. Multi-media device 110-*b* may be one example of multi-media devices 110-*a*-1 through 110-*a*-*n* depicted in FIGS. 1 and/or 2. Multi-media device 110-*b*, as depicted, may include a speaker 205-*a*, a microphone 210-*a*, a transmit/receive module 505 and a multi-media processor 510. Speaker 205-*a* may be one example of speaker 205 depicted in FIG. 2, although associated with multi-media device 110-*b* rather than device 105-*a*. Microphone 210-*a* may be one example of the microphone 210 depicted in FIG. 2, although associated with multi-media device 110-*b* rather than device 105-*a*.

The speaker 205-*a* and microphone 210-*a* may have the same or similar functionality as the speaker 205 and microphone 210 described above. One or both of speaker 205-*a* and 210-*a* may be integrated into each of the multi-media devices 110-*b*. Speaker 205-*a* may provide communication from device 105 to the user. Microphone 210-*a* may provide communications from the user to device 105.

Multi-media device 110-*b* may include a transmit/receive module 505 that operates to transmit and receive signals and data from device 105. Transmit/receive module 505 may directly transmit audio signals that represent communications from the user and/or responses from the voice control module of the device 105. Alternatively, multi-media processor 510 may conduct at least some logic or processing related to the audio signals that are communicated via speaker 205-*a* and microphone 210-*a*, and then send or receive only portions of the audible signal and/or other data via the transmit/receive module 505.

In some examples, microphone 210-*a* identifies a word or sound spoken by a user and the multi-media processor 510 confirms whether those words meet the requirements of a trigger word, command or inquiry. Once the status of the words (or sounds) is confirmed via the multi-media processor 510, the multi-media processor 510 may generate a response to the user via speaker 205-*a*, such as a confirmation of the trigger, command or inquiry. The microphone 210-*a* may receive the response from the user confirming the trigger, command or inquiry, and the multi-media processor 510 operates the transmit/receive module 505 to deliver a signal such as instructions to the voice control module 125, 125-*a* of the device 105. The voice control module 125 may respond to the multi-media device 110-*b* with signals such as instructions which the multi-media processor 510 translates into, for example, a response given through speaker 205-*a*. Accordingly, multi-media device 110-*b* may perform at least some filtering, processing and basic logic via the multi-media processor 510 which correlates with the operation of the device 105.

In other examples, multi-media processor 510 may provide a more limited role such as, for example, turning ON or OFF any one of the speaker 205-*a*, microphone 210-*a*, and transmit/receive module 505, and/or identify problems related to those components.

Each of the multi-media devices 110-*a*, 110-*b* may have an identification (ID) code associated therewith. Consequently, as signals or data are conveyed back and forth to any given multi-media device 110-*a*, 110-*b*, the system is able to identify the source of the signals and communicate with a user at the specific location on the property where the user resides.

There may be some situations where communications are broadcast to a plurality of multi-media devices 110-*a*, 110-*b*, (e.g., all of the multi-media devices), at least some scenarios only a single multi-media device is used to communicate with a user, or a subset of the multi-media devices. In spaces (e.g., multi-media rooms) that include more than one multi-media device 110-*a*, 110-*b*, all (or a subset) of the multi-media devices within that space may operate simultaneously to communicate with the user. In other embodiments, all (or a subset) of the multi-media devices 110-*a*, 110-*b* on a given floor, within a certain building, or within a defined exterior space may be used simultaneously to communicate with the user. In one example, once a voice control communication is initiated with a user at one location, the multi-media devices 110-*a*, 110-*b* in other areas of the property may be deactivated. Deactivating some of the multi-media devices during an ongoing communication with other multi-media devices 110-*a*, 110-*b* may reduce the amount of interference and noise, which may decrease the possibility of miscommunication between the system and the user.

In another embodiment, a plurality of multi-media devices 110-*a*, 110-*b* may detect a trigger word, command or inquiry and the system is able to determine which of the multi-media devices 110-*a*, 110-*b* is closest to the user based on, for example, the strength of the detected signal. The system then provides a responsive communication back to the user at the multi-media device 110-*a*, 110-*b* that was determined to be closest to the user.

Figure 6:
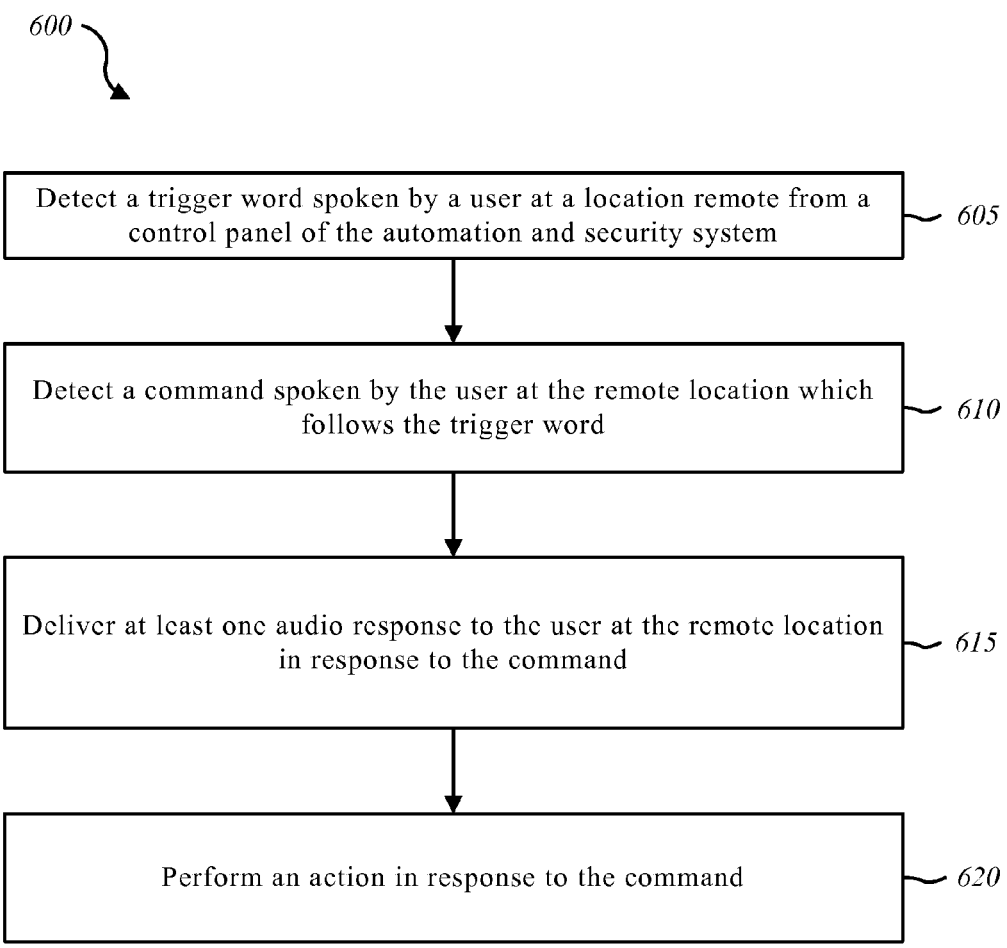
FIG. 6 is a flow diagram illustrating a method for voice control of an automation and security system.

FIG. 6 is a flow diagram illustrating one embodiment of a method 600 for voice control of an automation and security system. In some configurations, the method 600 may be implemented by the voice control module 125 of device 105 shown in FIGS. 1 2, and/or 4. In other examples, method 600 may be performed generally by device 105 shown in FIGS. 1 and/or 2, or even more generally by the environments 100, 200 shown in FIGS. 1 and/or 2. In some configurations, method 600 may be implemented in conjunction with multi-media devices 110 shown in FIGS. 1, 2 and/or 5.

At block 605, the method 600 includes detecting a trigger word spoken by a user at a location remote from a control panel of the automation and security system. Block 610 includes detecting a command spoken by the user at the remote location, wherein the command is detected following detection of a trigger word. Block 615 includes delivering at least one audio response to the user at the remote location in response to the command. Block 620 includes performing an action in response to the command.

As discussed above, the detection of trigger words and commands may be performed by a multi-media device that includes a speaker. Alternatively, the microphone may be used separate from a multi-media device and still provide the detecting functions any of the systems and methods disclosed herein. The audio response of the user may be done by a microphone, which also may be part of a multi-media device or, alternatively, may be used independent of a multi-media device. The multi-media device may include transmit/receive functionality that provides communications back and forth between a multi-media device (e.g., a speaker and/or microphone) and a remote management device that includes a voice control module and other voice control capabilities. The actions performed in response to the trigger words, command or inquiry may include an audio response to the user or action that may be conducted by the remote management device such as, for example, temperature control, security system control, lighting control, etc.

Figure 7:
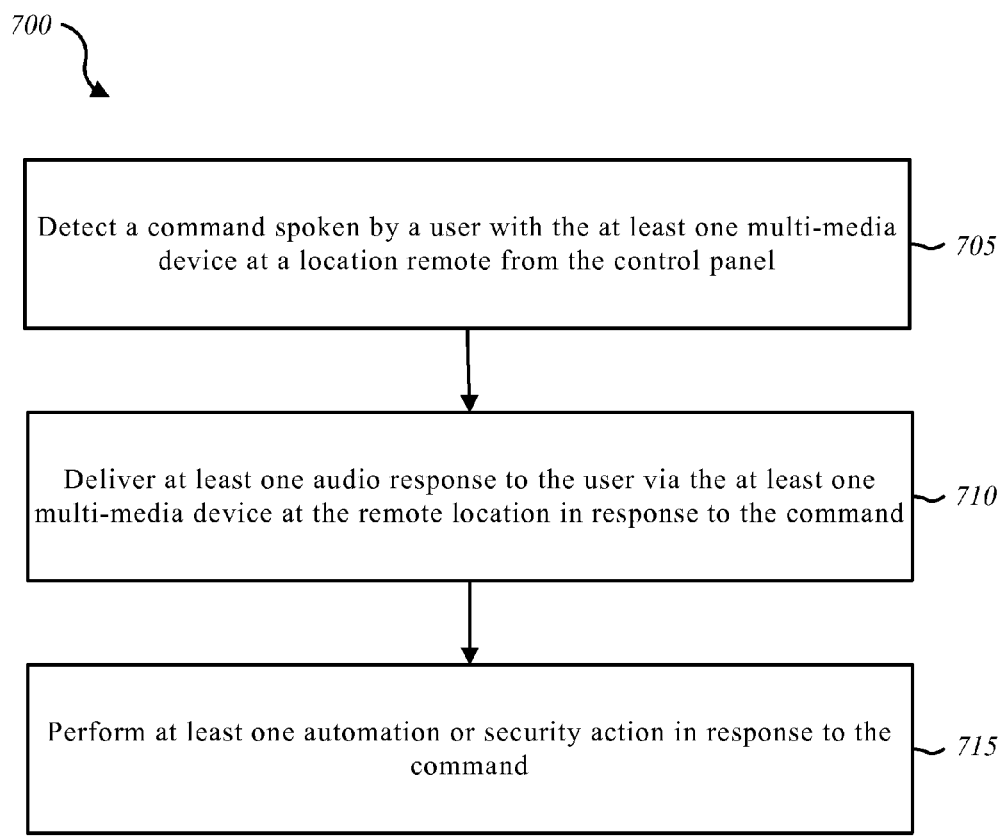
FIG. 7 is a flow diagram illustrating another method for voice control of an automation and security system.

FIG. 7 is a flow diagram illustrating one embodiment of a method 700 for voice control of an automation and security system. In some configurations, the method 700 may be implemented by the voice control module 125 of device 105, 105 shown in FIGS. 1 2, 3, and/or 4. In other examples, method 700 may be performed generally by device 105 shown in FIGS. 1 and/or 2, or even more generally by the environments 100, 200 shown in FIGS. 1 and/or 2. In some configurations, method 700 may be implemented in conjunction with multi-media devices 110 shown in FIGS. 1, 2 and/or 5.

At block 705, a step of detecting a command spoken by a user with at least one multi-media device at a location remote from the control panel is performed. Block 710 includes delivering at least one audio response to the user via at least one multi-media device at the remote location in response to the command. Block 705 includes performing at least one automation or security action in response to the command.

The detecting of a trigger word, command or inquiry as well as delivery of an audio response to a user may be conducted by or using at least one multi-media device. Alternatively, as discussed above, at least some of the communications back and forth with a user may be performed by the remote management device. Some of the logic and control associated with the detecting of trigger words, commands and inquiries as well as delivery of an audio response and performing automation and/or security actions may be conducted by a controller associated with a multi-media device or a controller associated with the remote management device.

Figure 8:
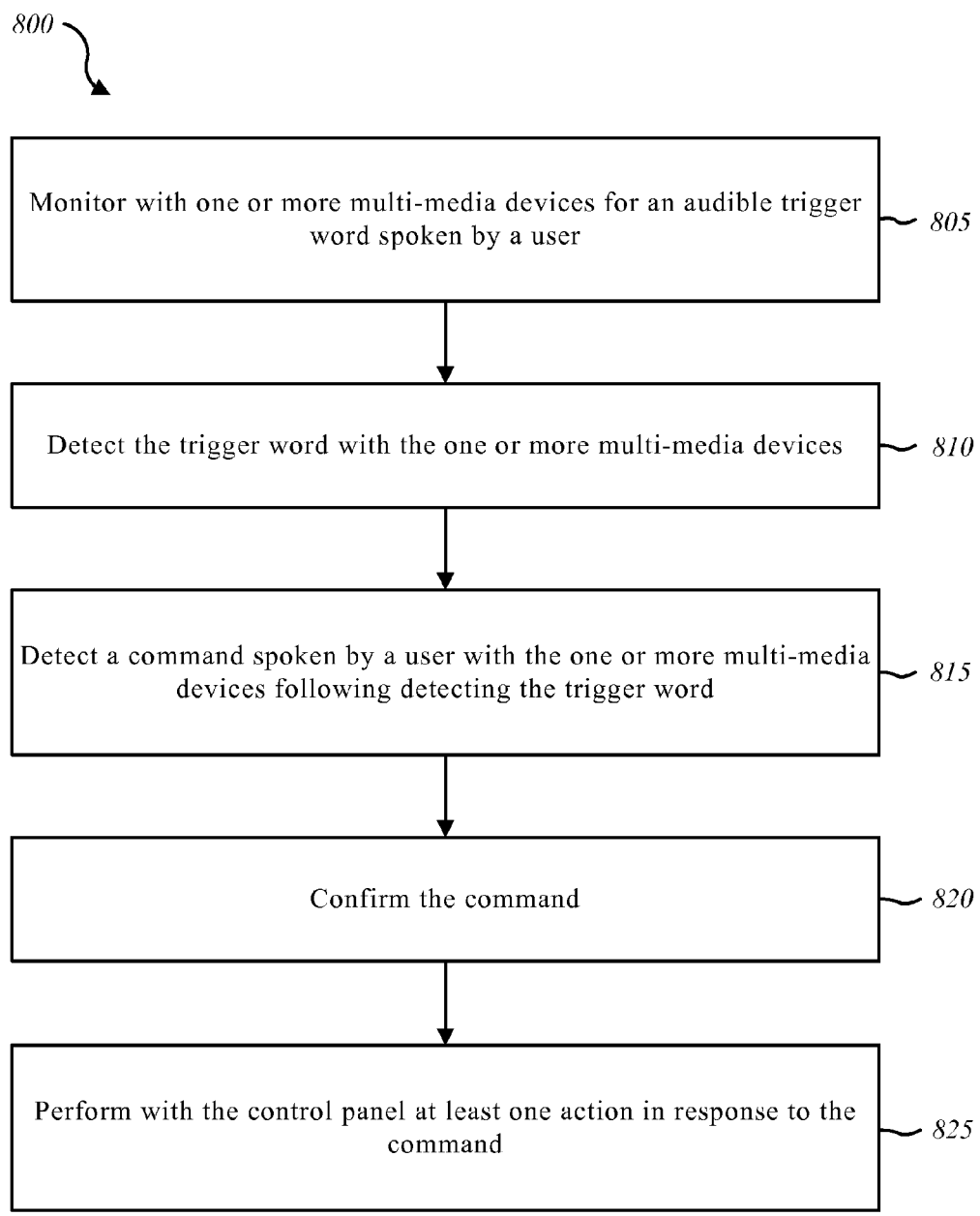
FIG. 8 is a flow diagram illustrating another method for voice control of an automation and security system.

FIG. 8 is a flow diagram illustrating one embodiment of a method 800 for voice control of an automation and security system. In some configurations, the method 800 may be implemented by the voice control module 125 of device 105 shown in FIGS. 1, 2, 3, and/or 4. In other examples, method 800 may be performed generally by device 105 shown in FIGS. 1 and/or 2, or even more generally by the environments 100, 200 shown in FIGS. 1 and/or 2. In some configurations, method 800 may be implemented in conjunction with multi-media devices 110 shown in FIGS. 1, 2 and/or 5.

At block 805, the method includes monitoring with at least one of a control panel and one or more multi-media devices for an audible trigger word spoken by a user. Block 810 includes detecting a trigger word with the one or more multi-media devices. Block 815 includes detecting a command spoken by a user with the one or more multi-media devices following detecting the trigger word. Block 820 includes confirming the command, and block 825 includes performing with the control panel at least one action and response to the command.

Other steps of method 800 may include confirming the command by delivering at least one audio message to the user via the at least one multi-media device in response to the command and detecting a confirming response from the user. The method may include filtering with the one or more multi-media devices at least one of the detected trigger word and the detected command before delivering the at least one of the detected trigger word and the detected command to the control panel. The step of confirming the command may include comparing the command to a database of commands. Confirming the command may be performed by the one or more multi-media devices.

Figure 9:
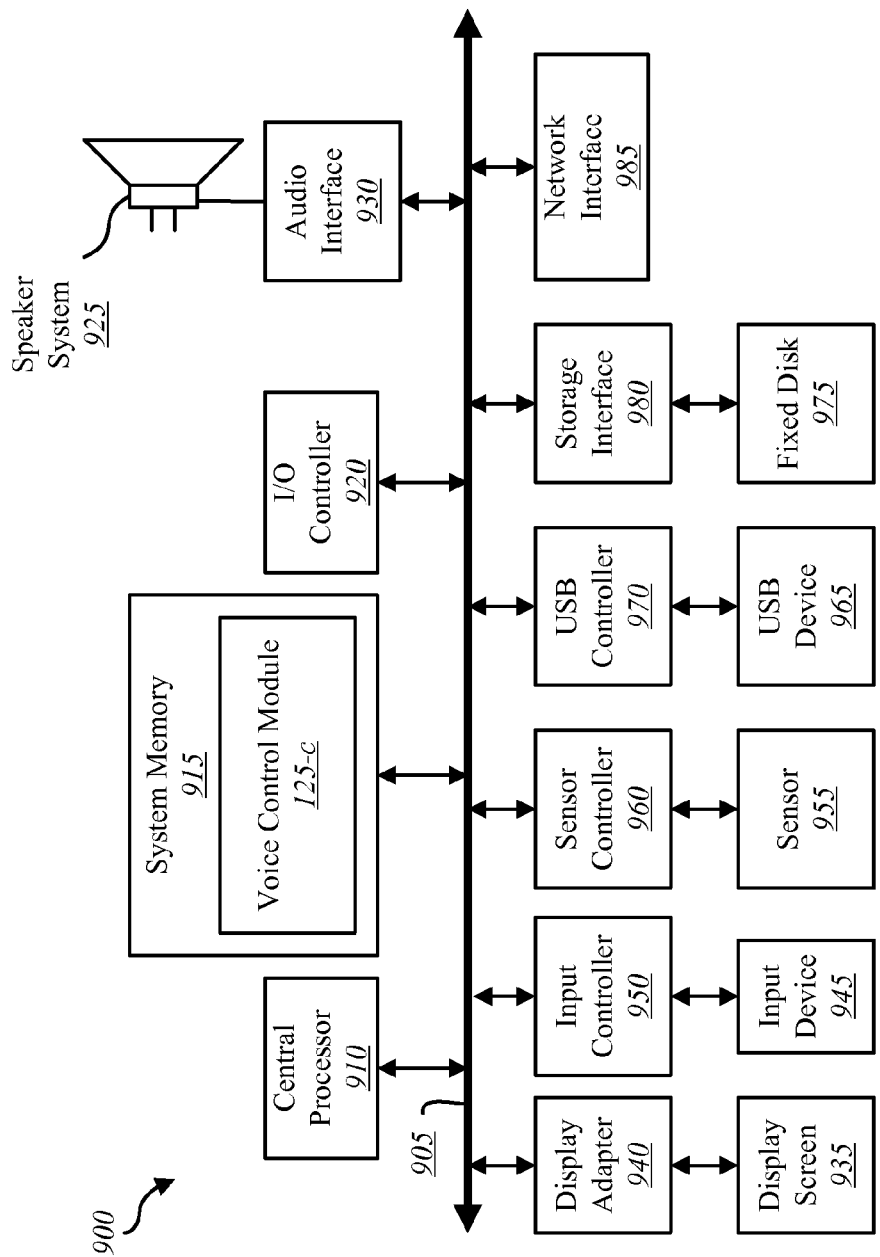
FIG. 9 is a block diagram of a computer system suitable for implementing the present systems and methods of FIGS. 1-8.

FIG. 9 depicts a block diagram of a controller 900 suitable for implementing the present systems and methods. The controller 900 may be an example of the device 105, mobile computing device 225, and/or home automation controller 235 illustrated in FIGS. 1 and/or 2. In one configuration, controller 900 includes a bus 905 which interconnects major subsystems of controller 900, such as a central processor 915, a system memory 920 (typically RAM, but which may also include ROM, flash RAM, or the like), an input/output controller 925, an external audio device, such as a speaker system 930 via an audio output interface 935, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 915 and system memory 920, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a voice control module 125-c to implement the present systems and methods may be stored within the system memory 920. The voice control module 125-c may be an example of the voice control module 125 illustrated in FIGS. 1, 2, 3 and/or 4. Applications (e.g., application 215) resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 920 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for voice control of an automation and security system, comprising:
    a processor;
    a memory in electronic communication with the processor; and
    instructions stored in the memory, the instructions being executable by a processor to:
        detect sound spoken by a user to a first multi-media device at a location remote from a control panel of the automation and security system;
        determine that the sound comprises a trigger word;
        determine that the sound further comprises a command spoken after the trigger word;
        send an instruction to deactivate a second multi-media device upon determining that the sound comprises at least one of the trigger word and the command spoken by the user;
        deliver at least one audio response to the first multi-media device at the remote location in response to the command; and
        perform an action in response to the command.

2. The apparatus of claim 1, wherein detecting the trigger word and detecting the command are performed by the at least one multi-media device, and the at least one multi-media device is distinct from the control panel.

3. The apparatus of claim 2, further comprising:
    delivering the command from the at least one multi-media device to the control panel.

4. The apparatus of claim 2, wherein the at least one multi-media device includes a speaker configured to deliver the at least one audio response to the user and a microphone configured to detect the trigger word and the command.

5. The apparatus of claim 1, wherein the at least one audio response includes a request for confirmation of the command, and the instructions are further executable by the processor to:
    detect a confirmation of the command spoken by the user at the remote location.

6. The apparatus of claim 1, wherein the at least one audio response includes a confirmation that the action is completed.

7. The apparatus of claim 1, wherein the instructions are executable by the processor to:
    detect with the control panel a trigger word spoken by a user;
    detect with the control panel a command spoken by the user which follows the trigger word detected with the control panel;
    deliver with the control panel at least one audio response to the user in response to the command; and
    perform an action in response to the command.

8. The apparatus of claim 7, wherein the control panel includes a speaker configured to deliver the at least one audio response from the control panel and a microphone configured to detect the trigger word and command with the control panel.

9. The apparatus of claim 1, further comprising:
    a plurality of multi-media devices at the remote location, wherein detecting the trigger word and detecting the command are performed by at least two of the plurality of multi-media devices.

10. A computer-program product for voice control of an automation and security system having at least one multi-media device and a control panel, the computer-program product comprising a non-transitory computer-readable medium storing instructions executable by a processor to:

detect sound spoken by a user to a first multi-media device at a location remote from a control panel;

determine that the sound comprises a trigger word;

determine that the sound further comprises a command spoken after the trigger word;

send an instruction to deactivate a second multi-media device upon determining that the sound comprises at least one of the trigger word and the command spoken by the user, the at least one multi-media device including the first and second multi-media devices;

deliver at least one of the detected trigger word and the detected command from the first multi-media device to the control panel;

deliver at least one audio response to the user via the first multi-media device at the remote location in response to the command; and perform at least one automation or security action in response to the command.

11. The computer-program product of claim 10, wherein the command includes a request for confirmation of a status of the automation and security system.

12. The computer-program product of claim 10, wherein the command includes turning ON or turning OFF a security feature of the automation and security system.

13. The computer-program product of claim 10, wherein delivering at least one audio response includes asking a question of the user to confirm the command.

14. The computer-program product of claim 10, wherein each of the at least one multi-media devices includes a microphone configured to detect the command and a speaker configured to deliver the at least one audio response.

15. A computer-implemented method for voice control of an automation and security system, comprising:

monitoring with one or more multi-media devices for a sound made by a user;

detecting the sound with a first multi-media device from the one or more multi-media devices, the first multi-media device being at a location remote from a control panel of the automation and security system;

determining with the first multi-media device that the sound comprises a trigger word;

determining with the first multi-media device that the sound further comprises a command spoken after the trigger word;

confirming the command;

delivering at least one of the detected trigger word and the detected command from the first multi-media device to the control panel;

sending, by the control panel, an instruction to deactivate a second multi-media device from the one or more multi-media devices upon detecting at least one of the trigger word and the command spoken by the user;

analyzing, by the control panel, at least one of the detected trigger word and the delivered command; and performing, based at least in part on the analysis, with the control panel at least one action in response to at least one of the trigger word and the command.

16. The method of claim 15, wherein confirming the command further comprises:

delivering at least one audio message to the user via the at least one multi-media device in response to the command and detecting a confirming response from the user.

17. The method of claim 16, wherein at least one of the one or more multi-media devices filter at least one of the detected trigger word and the detected command before delivering the at least one of the detected trigger word and the detected command to the control panel.

18. The method of claim 15, wherein confirming the command further comprises:

comparing the command to a database of commands.

19. The method of claim 15, wherein confirming the command is performed by at least one of the one or more multi-media devices.

\* \* \* \* \*